United States Patent [19]
Yamamoto et al.

[11] Patent Number: 5,336,516
[45] Date of Patent: Aug. 9, 1994

[54] KIMCHI-LIKE FOOD AND METHOD FOR PRODUCING THE SAME

[75] Inventors: Matsuo Yamamoto; Toshiaki Nakata; Hideaki Yabuuchi, all of Uji, Japan

[73] Assignee: Joyu Incorporated, Kyoto, Japan

[21] Appl. No.: 19,681

[22] Filed: Feb. 19, 1993

[30] Foreign Application Priority Data

Feb. 26, 1992 [JP] Japan ................... 4-076133

[51] Int. Cl.⁵ ............................... A23L 1/218
[52] U.S. Cl. ...................... 426/615; 426/49; 426/392; 426/401; 426/404; 426/407; 426/506; 426/518; 426/521; 426/650; 426/652; 426/654
[58] Field of Search ............... 426/49, 392, 401, 404, 426/407, 506, 518, 521, 615, 650, 652, 654

[56] References Cited

U.S. PATENT DOCUMENTS 5,192,565  3/1993  Buhler et al. .................... 426/49

OTHER PUBLICATIONS

*Collection of Korean Cuisines*, vol. 3 "Korean Pickles (Kimchi) and Storage Foods" (& English Translation).
Sunset Books, 1962, *Cooking with Foreign Accent*, Lane Book Co. Menlo Park, Calif. 2nd ed. pp. 27–30.
Wadsworth et al, 1939, *Food Industries* "How to Use Lactic Acid" pp. 324 & 325.

*Primary Examiner*—Helen Pratt
*Attorney, Agent, or Firm*—Wenderoth, Lind & Ponack

[57] ABSTRACT

A kimchi-like food produced by combining dried stalks of sanzo-sai, conventional kimchi additives, and improved kimchi additives, and processing the combination according to a new process which includes a two-step aging process. The resulting kimchi-like food is crisp, full-flavored, and sour, and maintains these qualities through long-term storage.

4 Claims, No Drawings

KIMCHI-LIKE FOOD AND METHOD FOR PRODUCING THE SAME

BACKGROUND OF THE INVENTION AND RELATED ART STATEMENT

1. Field of the Invention

The present invention relates to a crisp, delicious kimchi-like food which is more pleasant to the palate than kimchi that is daily served as pickles in Korea, and which employs dried stalks of sanzo-sai, a high class Chinese vegetable (Chinese name: *kosai*), as its raw material, and moreover, which may be served together with meat dishes, cooked rice, noodles and almost all other foods. The invention further relates to a method for producing the same.

2. Description of the Prior Art

Kimchi, conventionally produced and daily favored in Korea and recently appreciated in Japan also, are pickles of vegetables comprising about 80% by weight of such ordinarily grown, commercially available vegetables as Chinese cabbage, cucumber, radish and Nozawa-na (a turnip), and about 20% comprising garlic, such fruits as pears and mandarin oranges, and such ingredients as ginger, fermented marine products like fermented and salted cuttlefish viscera, red pepper and seasonings.

SUMMARY OF THE INVENTION

The above-mentioned conventional kimchi, as it is so called, is no more than Korean pickles that are made by blending common vegetables such as Chinese cabbage, cucumber and radish with garlic, fruits, ginger, fermented marine products, table salt, pepper and various seasonings. As a result, its taste is neither more nor less than that of ordinary pickles. There has been a demand for improving kimchi so as to be appreciated by Japanese people, from the perspective of both industry and consumers.

The present invention has been accomplished to meet the above demand after thorough studies by the inventors. Its primary object is therefore to provide a crisp, pleasant to the palate, and delicious kimchi-like food which has been improved so as to taste good to Japanese people when eaten not only by itself but also together with various other foods, by choosing as its raw material dried stalks of sanzo-sai, a high-class vegetable in China, as described before, blending various seasoning additives as described later, and finishing by controlling the process of its production, and further to provide a method for producing the same.

DETAILED DESCRIPTION OF THE PREFERRED EMBODIMENT

In the present invention, as the raw material, dried stalks of sanzo-sai are primarily used as the main ingredient. They are processed successively by soaking in warm water, washing with water, cleaning, cutting into convenient sizes, pickling with salt, and removing harsh-tasting components. Then, garlic, fruits such as pear and mandarin orange, ginger, fermented and salted cuttlefish viscera or the like, table salt, pepper and seasonings, all of which have conventionally been used in making ordinary kimchi, are added, and, in addition in this invention, acidifying agents, soy sauce, preservatives and other additives are further added. The mixture is stored in a refrigerator at about 2°–6° C. for 12 hours or longer to perform the primary aging. Then pH is adjusted to about 4.5–4.8 by adding an acidifying agent if required and the salt concentration is adjusted to about 1.3–1.8% by weight by further adding table salt if required. The mixture is vacuum-packaged and thereafter stored in a refrigerator at about 2°–6° C. for about 1–10 days to perform the secondary aging. Subsequently, the vacuum-packaged product is sterilized in hot water at about 80° C. for 10 minutes, 176° C. thus obtaining the final product. Cooling should be done rapidly with running water, and the product is preferably stored temporarily in a refrigerator.

EXAMPLE 1

Dried stalks of sanzo-sai (2 kg) were put in an adequate container and soaked in hot water at 70° C. for about 20 minutes. The stalks were then cut into 2–3 cm long pieces and their roots and leaves were removed, thus providing the stalk pieces alone. The leaves should be removed because they, if mixed in the product food, would cause the food to be discolored to black, impairing its appearance as food and disturbing their characteristic crispness. Then, mixed with about 10% by weight of table salt in proportion to the whole sanzo-sai, the stalk pieces were pickled for 3 days or longer with a weight thereon. The crude pickle thus obtained was washed with water until its weight increased by about 5–7 times, followed by removal of the harsh taste. Since sanzo-sai contains harsh taste components, they must be removed completely by repeating the washing-with-water and removal-of-harsh-taste process two or more times. After this was accomplished, about 20 kg of pickles were placed into a cask with a weight applied thereon to remove moisture. Subsequently, appropriate amounts of garlic, fruits, ginger, fermented fish viscera, table salt and red pepper were added to the pickle bulks, and, in addition, specified amounts of seasoning, sour agent, preservative, pale soy sauce and other ingredients were also added. The seasoning employed was sodium glutamate and the acidifying agent was acetic acid, citric acid, malic acid or any other organic acid that is ordinarily used for food processing. Potassium sorbate was used as a preservative. An ordinary, commercially available pale soy sauce is sufficient as the pale soy sauce in this use. The whole mixture was stored at a refrigerator temperature (about 2°–6° C.) for 12 hours or longer to perform the primary aging. Then pH was adjusted to about 4.5–4.8 by adding an acidifying agent, if required, and the salt concentration was adjusted to 1.3–1.8% by weight by adding table salt, if required, through measurement. The pickled product was then vacuum-packaged and the foam was removed. The packages were stored at a refrigerator temperature for 1–10 days for the secondary aging. Thereafter the product was sterilized by dipping it in 80° C. hot water for 10 minutes, and then cooled (rapid cooling with running water), thus obtaining the finished product. The product is preferably stored in a refrigerator.

The effects of the present invention may be summarized as follows:

(1) Because the food produced according to this invention uses only stalks of a high-class vegetable "sanzo-sai" grown in China, it is so crisp, pleasant to the palate and delicious that it nicely matches foods eaten while drinking alcoholic liquors, meat dishes, cooked rice and noodles when taken together;

(2) Using seasonings, soy sauce, preservatives and other additives in addition to those conventionally used in kimchi, it is produced by the primary and secondary aging with the results that it has a full flavor, is sour and holds it characteristic flavor, which altogether will appeal to the Japanese palate, with the additional benefit that it withstands long storage and maintains its characteristic flavor and taste for a long time; and (3) Produced through many steps of processing, it is endowed with unchangeable flavor and taste which are characteristic of a high-class food, by adjusting the pH value and measuring the salt concentration.

What is claimed is:

1. A kimchi-like food comprising dried stalk of sanzo-sai, garlic, fruit, ginger, table salt, red pepper, fermented fish viscera, seasoning, acidifying agent(s), preservative(s), and soy sauce.

2. A method for producing a kimchi-like food, comprising the successive steps of
   (a) soaking dried sanzo-sai stalks in hot water;
   (b) cutting said stalks into pieces having processable lengths;
   (c) pickling said pieces with salt;
   (d) repeatedly washing said pieces with water to remove harsh-tasting components;
   (e) mixing garlic, fruit, ginger, table salt, red pepper, fermented fish viscera, seasoning, acidifying agent(s), preservative(s), and soy sauce with said pieces in a sealable container;
   (f) aging said mixture at about 2°–6° C. for at least 12 hours;
   (g) adjusting the pH of said mixture to about 4.5–4.8 by adding an acidifying agent, if necessary;
   (h) adjusting the salt concentration of said mixture to about 1.3–1.8 wt % by adding table salt, if necessary;
   (i) vacuum packing said mixture;
   (j) further aging said mixture at about 2°–6° C. for at least one day;
   (k) sterilizing said mixture; and
   (l) rapidly cooling said mixture.

3. The method according to claim 2, wherein said mixture is sterilized by a 10 minute submersion in an 80° C. water bath.

4. The method according to claim 2 or 3, wherein said sterilized mixture is rapidly cooled by contacting it with running water.

* * * * *